(12) United States Patent
Seo et al.

(10) Patent No.: US 11,965,609 B2
(45) Date of Patent: Apr. 23, 2024

(54) VALVE FOR PREVENTING BACKFLOW AND VALVE MODULE

(71) Applicant: KAMTEC INC., Chungcheongbuk-do (KR)

(72) Inventors: Chang Ho Seo, Hwaseong-si (KR); Seung Yong Kim, Hwaseong-si (KR); Jung Suek Koo, Hwaseong-si (KR)

(73) Assignee: KAMTEC INC., Chungcheongbuk-do (KR)

( * ) Notice: Subject to any disclaimer, the term of this patent is extended or adjusted under 35 U.S.C. 154(b) by 13 days.

(21) Appl. No.: 17/855,831

(22) Filed: Jul. 1, 2022

(65) Prior Publication Data

US 2023/0010189 A1    Jan. 12, 2023

(30) Foreign Application Priority Data

Jul. 8, 2021  (KR) .......................... 10-2021-0089626
Jul. 8, 2021  (KR) .......................... 10-2021-0089640

(51) Int. Cl.
| | |
|---|---|
| F16K 15/02 | (2006.01) |
| F01N 3/22 | (2006.01) |
| F01N 3/30 | (2006.01) |
| F16K 15/18 | (2006.01) |
| F16K 31/04 | (2006.01) |
| F16K 39/02 | (2006.01) |
| F16K 41/00 | (2006.01) |

(52) U.S. Cl.
CPC ............ *F16K 39/024* (2013.01); *F01N 3/222* (2013.01); *F01N 3/30* (2013.01); *F16K 15/028* (2013.01); *F16K 15/182* (2021.08); *F16K 31/047* (2013.01); *F16K 41/00* (2013.01); *F01N 2390/02* (2013.01)

(58) Field of Classification Search
CPC ...... F16K 39/024; F16K 31/047; F16K 41/00; F16K 15/028; F16K 31/04; F16K 31/53; F16K 31/54; F16K 15/18–182; F01N 2390/02; F01N 3/30; F01N 3/222; F02M 26/67–69
USPC ............... 251/129.03, 14; 137/543.15, 614.2
See application file for complete search history.

(56) References Cited

U.S. PATENT DOCUMENTS

| | | | | |
|---|---|---|---|---|
| 5,421,366 A | * | 6/1995 | Naffziger | .................. F01N 3/30 |
| | | | | 137/614.19 |
| 2007/0163554 A1 | | 7/2007 | Bircann et al. | |
| 2008/0110159 A1 | | 5/2008 | Komiyama et al. | |

FOREIGN PATENT DOCUMENTS

| | | | | |
|---|---|---|---|---|
| DE | 102006021467 A1 | * | 11/2007 | ............... F01N 3/22 |
| DE | 102006024728 A1 | * | 11/2007 | ............. F02M 26/50 |
| DE | 102016117575 A1 | * | 3/2018 | ............... F01N 3/30 |

(Continued)

*Primary Examiner* — Marina A Tietjen
(74) *Attorney, Agent, or Firm* — Park, Kim & Suh, LLC

(57) ABSTRACT

The present disclosure relates to an air supply valve having a backflow prevention function and a valve module, for preventing backflow of air or gas through an outlet. The air supply valve includes a housing that includes a motor mounted therein and in which a supply flow path and an outlet of air are formed, a driver including a gear part for transmitting driving force of the motor and a converter for converting rotation of the gear part to linear motion, and a valve module that is coupled to an end of the converter and is opened while being spaced apart from the outlet of the housing to be connected to the supply flow path or is closed while being in contact with the outlet.

18 Claims, 15 Drawing Sheets

(56) References Cited

FOREIGN PATENT DOCUMENTS

| | | | |
|---|---|---|---|
| JP | 2009-243328 A | 10/2009 | |
| KR | 10-1057066 B1 | 8/2011 | |
| KR | 10-2012-0069182 A | 6/2012 | |
| KR | 10-1519904 B1 | 5/2015 | |
| KR | 10-2018-0079652 A | 7/2018 | |
| KR | 10-1952253 B1 | 5/2019 | |
| WO | WO-9923405 A1 * | 5/1999 | ............. F02M 26/69 |
| WO | WO-2021144083 A1 * | 7/2021 | |

* cited by examiner

VALVE FOR PREVENTING BACKFLOW AND VALVE MODULE

CROSS-REFERENCE TO RELATED APPLICATIONS

This application claims the benefit of Korean Patent Application Nos. 10-2021-0089626 and 10-2021-0089640, filed on Jul. 8, 2021, which are hereby incorporated by reference as if fully set forth herein.

BACKGROUND OF THE INVENTION

Field of the Invention

The present disclosure relates to an air supply valve with a backflow prevention function and a valve module, and more particularly to an air supply valve with a backflow prevention function and a valve module, for preventing backflow of air or gas through an outlet.

Discussion of the Related Art

A valve applied to a vehicle controls a flow amount of air (fresh air) supplied to an engine of the vehicle or exhaust gas discharged from the engine.

The conventional vehicle valves include a housing, a driver provided in the housing, a driving force transmitter connected to the driver and implemented as a gear assembly, a shaft connected to the driving force transmitter to rotate, and a valve plate which is rotatably provided inside a flow path provided inside the housing and is coupled to the shaft to control an opening degree of the flow path according to rotation of the shaft and to open and close the flow path.

Generally, a valve plate is formed in a metal disc, and is fastened by a coupling member such as a bolt in a state in which the valve plate is inserted into a slot formed in a central region of a shaft. A rotation center of the shaft is positioned in a central region of the flow path.

In this valve structure, when the shaft rotates and the valve plate becomes parallel to a direction of flow in the flow path, the valve is in a fully open state, and when the valve plate is inclined with respect to a direction of flow in the flow path, and an edge of the valve plate touches an inner wall of the flow path, the valve is in a fully closed state.

However, although, the valve plate is easily opened in the valve as configured above, when a large pressure is generated in a direction in which gas flows backward, there is a problem in that the valve plate is partially opened and gas flows backward in an opposite direction opposite to a direction in which air is supplied.

SUMMARY OF THE INVENTION

To overcome the problem, an object of the present disclosure is to provide an air supply valve having a backflow prevention function and a valve module for supplying air toward an outlet and preventing backward of exhaust gas in an opposite direction to a direction in which air is supplied.

According to the present disclosure, an air supply valve having a backflow prevention function includes a housing that includes a motor mounted therein and in which a supply flow path and an outlet of air are formed, a driver including a gear part for transmitting driving force of the motor and a converter for converting rotation of the gear part to linear motion, and a valve module that is coupled to an end of the converter and is opened while being spaced apart from the outlet of the housing to be connected to the supply flow path or is closed while being in contact with the outlet, wherein the driver includes a stem that is connected to the valve module and moves in a straight line, wherein a support of the valve module is coupled and fixed to the stem, and wherein a shielding part of the valve module is provided to relatively move with respect to the support and the stem, is provided to be moved by a pressure of air applied to the valve module, closes the outlet by receiving a pressure of backflow air when backflow applied to the valve module is generated, is lowered according to a larger air pressure than elastic force of an elastic part, applied from an upper part of the shielding part, and is raised according to a pressure of backflow air applied from a lower part of the shielding part According to the present disclosure, a valve module for selectively opening and closing the outlet according to linear motion of a stem of a valve in an outlet of a valve housing includes a support provided at an end of the stem, a shielding part provided to relatively move with respect to the support and the stem, provided to be moved by a pressure of air applied to the valve module valve module, and closing the outlet by receiving a pressure of backflow air when backflow applied to the valve module is generated, and an elastic part configured to elastically support the shielding part against the support, wherein the shielding part is lowered according to a larger air pressure than elastic force of the elastic part, applied from an upper part of the shielding part, and is raised according to a pressure of backflow air applied from a lower part of the shielding part.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings.

DETAILED DESCRIPTION OF THE INVENTION

Figure 1:
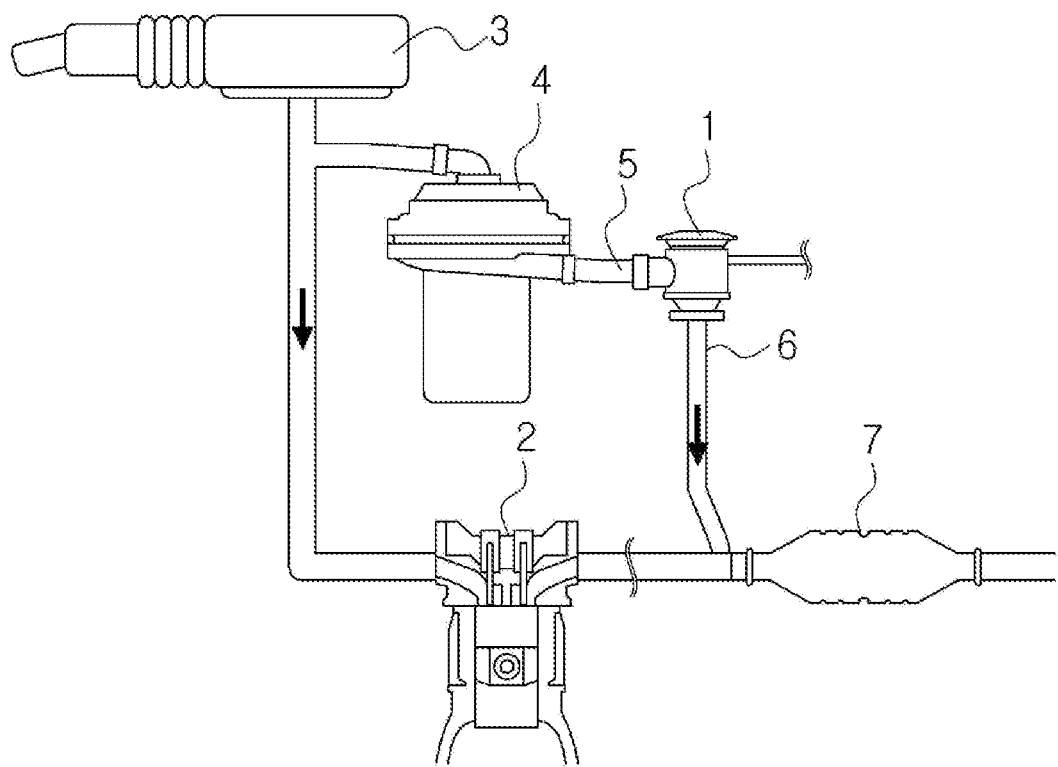
FIG. 1 is a schematic reference diagram showing a position at which an air supply valve having a backflow prevention function is installed according to an embodiment of the present disclosure.

Exemplary embodiments of the present disclosure can be variously changed and embodied in various forms, in which illustrative embodiments of the present disclosure are shown.

However, exemplary embodiments of the present disclosure should not be construed as being limited to the embodiments set forth herein and any changes, equivalents or alternatives which are within the spirit and scope of the present disclosure should be understood as falling within the scope of the present disclosure.

It will be understood that, although the terms "first", "second", "third" etc. may be used herein to describe various elements, these elements should not be limited by these terms.

These terms are only used to distinguish one element from another element.

For example, a first element may be termed a second element, and a second element may be termed a first element, without departing from the teachings of the present disclosure.

The term "and/or" includes a combination of a plurality of related listed items or any of a plurality of related listed items.

It will be understood that when an element, such as a layer, a region, or a substrate, is referred to as being "on", "connected to" or "coupled to" another element, it may be directly on, connected or coupled to the other element or intervening elements may be present.

In contrast, when an element is referred to as being "directly on," "directly connected to" or "directly coupled to" another element or layer, there are no intervening elements or layers present.

The terms used in the present specification are used for explaining a specific exemplary embodiment, not limiting the present disclosure.

The singular expressions in the present specification include the plural expressions unless clearly specified otherwise in context.

It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

Hereinafter, the present disclosure will be described in detail by explaining exemplary embodiments of the present disclosure with reference to the attached drawings. Like reference numerals in the drawings denote like elements.

FIG. 1 is a schematic reference diagram showing a position at which an air supply valve having a backflow prevention function is installed according to an embodiment of the present disclosure.

Referring to FIG. 1, the air supply valve 1 (hereinafter referred to as the valve) having a backflow prevention function according to the present disclosure may be controlled to mix some air in a process of discharging exhaust gas from an engine 2 of a vehicle to an exhaust device.

For example, the valve 1 may be connected to an exhaust pipe, that is, an exhaust pipe disposed between an exhaust manifold and a catalytic converter to supply air.

Accordingly, outside air may be supplied to the valve 1 through a supply flow path 5 by receiving a pressure of an air pump 4 after passing through an air filter 3.

In addition, outside air may be supplied to the exhaust manifold through a discharge flow path 6 by opening and closing the valve 1.

In the exhaust manifold, a high pressure may be formed by exhaust gas discharged after explosion stroke inside a cylinder to allow exhaust gas to flow toward the valve 1, and thus a backflow prevention function of the valve 1 may be required.

A reference numeral "7" that is not described in FIG. 1 refers to a catalytic converter.

Figure 2:
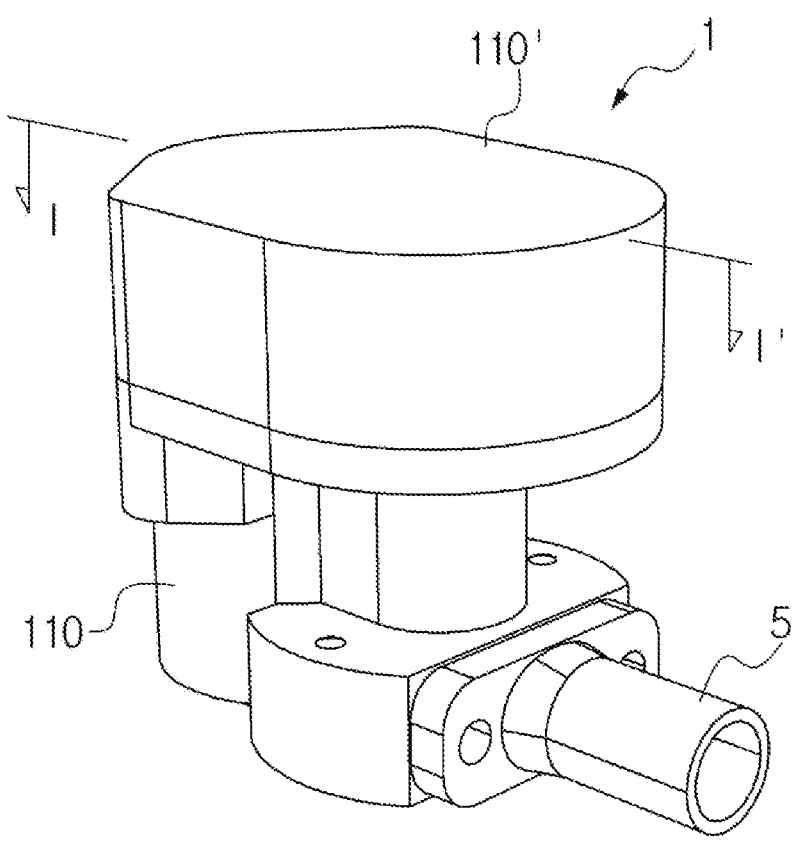
FIG. 2 is an enlarged perspective view of an air supply valve having a backflow prevention function shown in FIG. 1.
Figure 3:
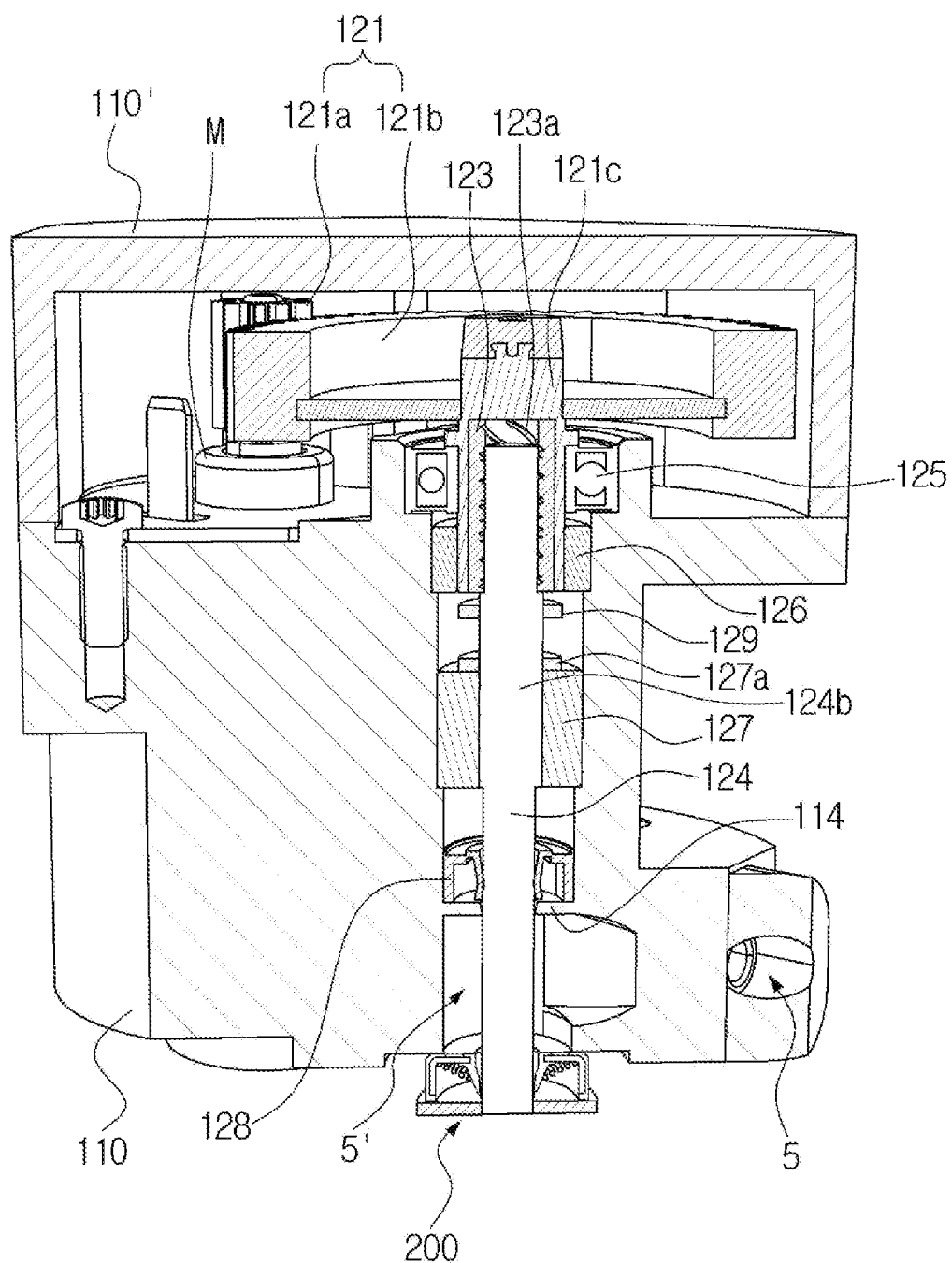
FIG. 3 is a cross-sectional view showing a section of the valve shown in FIG. 2 taken along I-I'.
Figure 4:
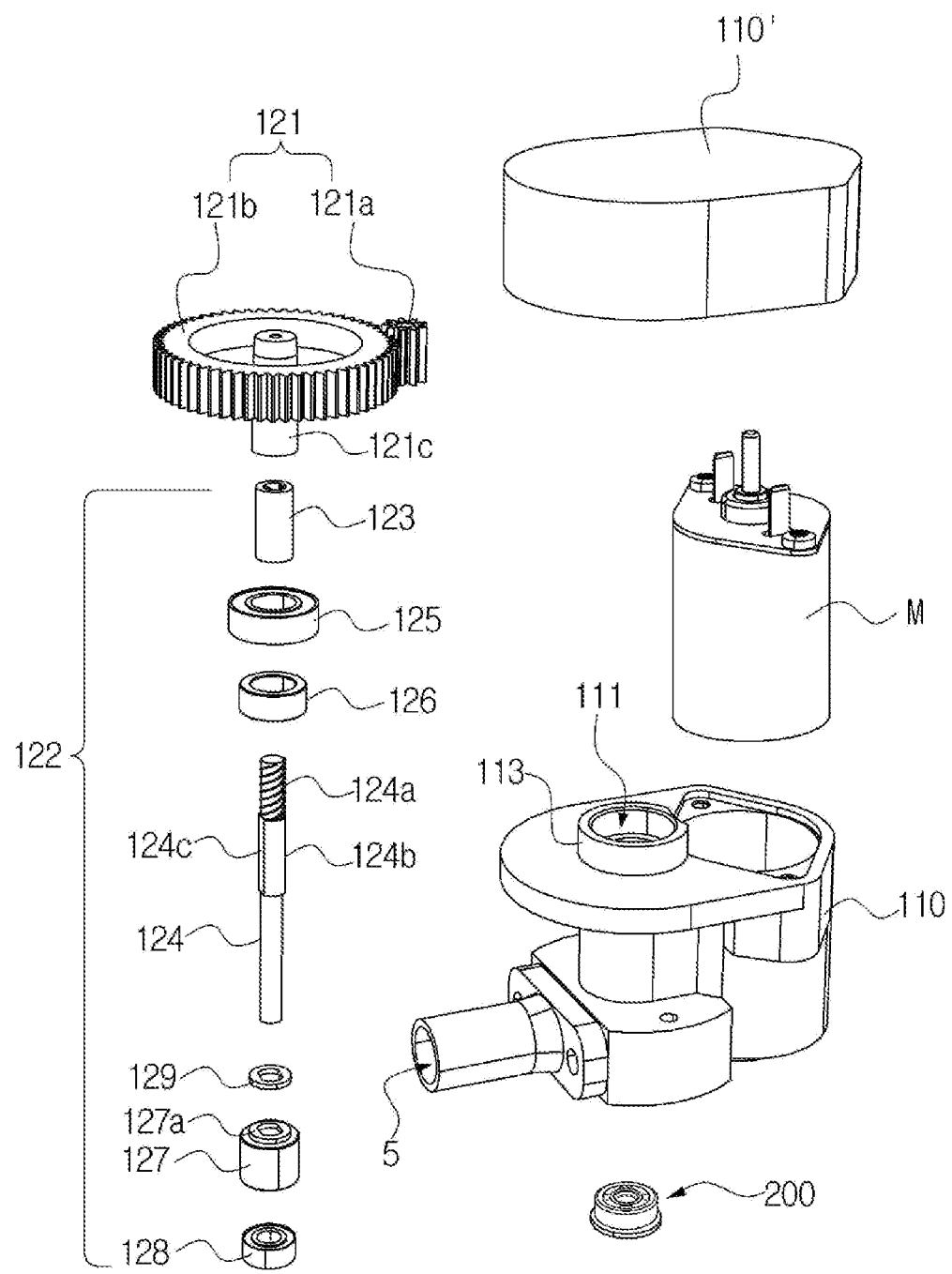
FIG. 4 is an exploded perspective view of an air supply valve having a backflow prevention function shown in FIG. 2.

FIG. 2 is an enlarged perspective view of the valve shown in FIG. 1. FIG. 3 is a cross-sectional view showing a section of the valve shown in FIG. 2 taken along I-I'. FIG. 4 is an exploded perspective view of the valve shown in FIG. 2.

Referring to FIGS. 2 to 4, the valve 1 according to an embodiment of the present disclosure may include a housing 110, a driver 120, and a valve module 200.

The housing 110 may define an outer appearance of the air supply valve 1 and may accommodate a motor M and the driver 120 therein.

As shown in FIGS. 3 and 4, the motor M may be mounted at a left side of an inside of the housing 110, a gear part 121 for transmitting rotational force of the motor may be disposed at an upper part, an operation hole 111 (refer to FIG. 4) may be formed at a right side of the inside of the housing 110, and a converter 122 may be mounted inside the operation hole 111.

The supply flow path 5 that is connected to a portion of a lower side of the operation hole 111 and through which air (or fresh air) is introduced may be provided on one side surface of the housing 110.

An outlet 112 (refer to FIG. 5) may be formed at a lower side of the housing 110, the valve module 200 may be disposed at the outlet 112, and air may be supplied or may be blocked via an operation of the valve module 200.

A cover 110' may be coupled to an upper side of the housing 110 to cover the gear part 121.

The driver 120 may include the gear part 121 and the converter 122.

The gear part 121 may include a main gear 121a (e.g., a pinion) coupled to a rotation shaft of the motor M, and a driven gear 121b that is engaged with the main gear 121a and is decelerated or accelerated.

According to the embodiment, an example in which the driven gear 121b rotates at reduced speed will be described as shown in FIG. 3.

Needless to say, the gear part 121 may include an additional gear (not shown) separately in consideration of a reduction ratio or rotation direction of the main gear 121a and the driven gear 121b.

A hollow shaft 121c may be provided at a rotation center of the driven gear 121b.

The driven gear 121b may be rotatably installed at the top of the operation hole 111.

The converter 122 may convert rotational motion of the gear part 121 into linear motion.

The converter 122 may include a mold 123, a stem 124, a bearing 125, a first bush 126, a second bush 127, and a sealing member 128.

The mold 123 may be inserted into the hollow shaft 121c and may be rotated with the driven gear 121b. One end of the stem 124 may be coupled to an inside of the mold 123. In this case, the mold 123 and the stem 124 may be screwed together. That is, a female screw 123a and a male screw 124a may be formed in the mold 123 and the stem 124, respectively, and may be engaged with each other.

Accordingly, when the driven gear 121b rotates forward, the stem 124 may rise, and conversely, when the driven gear 121b rotates backward, the stem 124 may descend.

Needless to say, a rotation direction of the driven gear 121b and a movement direction of the stem 124 may be opposite to each other.

Although not shown in the drawings, a female screw (not shown) may be molded on an inner circumference of the hollow shaft 121c to convert rotational motion of the driven gear 121b to linear motion of the stem 124 without separately installing the mold 123. Alternatively, instead of the hollow shaft 121c, the mold 123 may be installed at a rotation center of the driven gear 121b.

A bearing may be provided at an upper end 113 of the operation hole 111. The bearing 125 may be interposed between the hollow shaft 121c and the housing 110 to support rotation of the driven gear 121b.

The first bush 126 may be coupled to an outer circumference of an end of a lower side of the hollow shaft 121c. The first bush 126 may be interposed between the hollow shaft 121c and the housing 110, and may be spaced apart from the bearing 125 to firmly support rotation of the driven gear 121b. In this case, ends of lower sides of the hollow shaft 121c, the mold 123, and the first bush 126 may be arranged on the same line.

The second bush 127 for supporting linear motion of the stem 124 may be further provided inside the operation hole 111. The second bush 127 may be disposed adjacent to a central region of the stem 124.

A coupler 124b may be provided in a central region of the stem 124, which is in contact with the second bush 127, and a cross-section of the coupler 124b may have a shape other than a circle. For example, as shown in FIG. 4, both sides of the circular coupler 124b of the stem 124, which face each other, may be provided as a plane 124c. The inner circumference of the second bush 127 may have a shape corresponding to the outer circumference of the coupler 124b of the stem 124. Accordingly, it may be possible to prevent the stem 124 from rotating while the second bush 127 supports linear reciprocating motion of the stem 124.

Here, the coupler 124b may be formed to have a range longer than at least a distance at which the stem 124 moves in a straight line in order to maintain guidance of linear motion of the stem 124 inside the second bush 127.

Although not shown in the drawings, one cross section of the coupler 124b of the stem 124 may be formed in a polygon including a triangle or an elliptical shape, and when one cross section of the coupler 124b has a circular shape, a key (not shown) may be provided between the stem 124 and the second bush 127 in a longitudinal direction.

A stopper 129 may be provided on the coupler 124b of the stem 124.

An inner circumference of the stopper 129 may have a shape corresponding to a shape of an outer circumference of the coupler 124b of the stem 124 to be coupled thereto, and may move in conjunction with linear motion of the stem 124. In this case, the stopper 129 may limit a range of linear motion of the stem 124 because the stopper 129 moves in an area between the hollow shaft 121c or the end of the mold 123 and the second bush 127.

That is, a range between a position to which the stem 124 is lowered to the maximum and a position to which the stem 124 is raised to the maximum by rotation of the driven gear 121b may correspond to a movement range of the stopper 129. Thus, the stem 124 may not be further raised when the stopper 129 comes in contact with the hollow shaft 121c and may not be further lowered when the stopper 129 comes in contact with the second bush 127, thereby preventing the stem 124 from being separated from the inside of the mold 123 while deviating from and being disengaged with the inside of the mold 123. Needless to say, rise of the stem 124 may be limited while the stopper 129 is in contact with the hollow shaft 121c, but rise of the stem 124 may also be limited while a valve module 200 is in close contact around the outlet 112.

A buffer material 127a may be provided on one side of the second bush 127 to correspond to an area in contact with the stopper 129. The buffer material 127a may be formed of, for example, silicone or synthetic rubber material, and may prevent the stopper 129 from coming into direct contact with the second bush 127 to reduce friction noise and wear. The buffer material 127a may be disposed on an upper surface of the second bush 127 or on a lower surface of the stopper 129.

Although not shown in the drawing, the stopper 129 may also be disposed between the second bush 127 and the sealing member 128.

The sealing member 128 may shield the inside of the operation hole 111. A stair 114 protruding toward the stem 124 inside the operation hole 111 may be provided in the housing 110. The sealing member 128 may be coupled to the stair 114 in close contact therewith between the stair 114 and the second bush 127. The sealing member 128 may be formed of synthetic rubber or silicone and may be disposed in close with the inner circumference of the operation hole 111 and the outer circumference of the stem 124, thereby preventing inflow of air or moisture contained in air. That is, the sealing member 128 may block inflow of air or moisture into the operation hole 111 from an air flow area 5' in which the operation hole 111 and the supply flow path 5 overlap between the stair 114 and the outlet 112.

Accordingly, according to the present disclosure, a valve module that moves in a straight line may be provided to firmly maintain an open and close state even under a large pressure, and a stopper may be installed on a stem that moves in a straight line to prevent the stem from being separated from the mold.

A stair may be provided in a mounting groove inside a housing, and a sealing member may be installed on the stair, thereby preventing inflow of moisture toward the driver and preventing rotation between the second bush and the stem.

Figure 5:
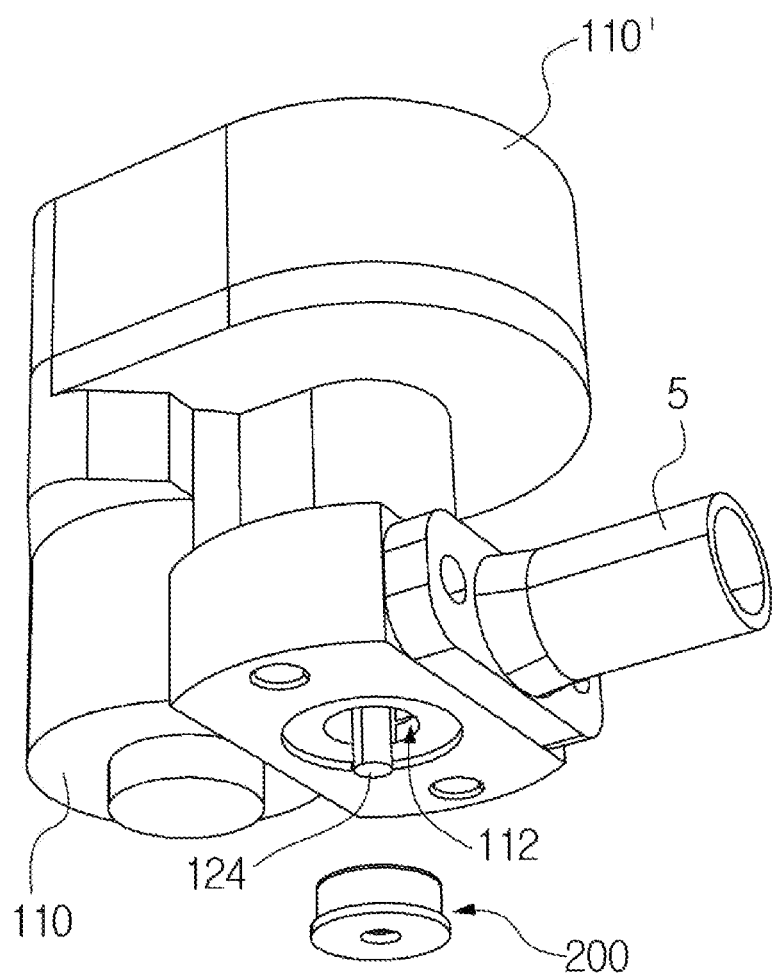
FIG. 5 is a perspective view showing the case in which a valve module provided below a housing of the valve shown in FIG. 2 is separated from the valve.

FIG. 5 is a perspective view showing the case in which a valve module provided below a housing of the valve shown in FIG. 2 is separated from the valve.

Referring to FIG. 5, the valve 1 may include the valve module 200 adjacent to the outlet 112 at a lower portion of the housing 110.

The valve module 200 may be disposed outside the outlet 112, and the outlet 112 may be opened by moving the valve module 200 away from the outlet 112 according to linear motion of the stem 124 or may be closed by moving the valve module 200 in close contact with the outlet 112.

In the supply flow path 5, a pressure to which air is continuously supplied may be maintained, and in the state in which the valve module 200 closes the outlet 112, even if the pressure applied to the supply flow path 5 is high, the outlet 112 may not be opened. Needless to say, even if a pressure of air or gas is applied in a direction toward the supply flow path 5 through the outlet 112, the outlet 112 may not be opened.

The valve module 200 may operate in one mode of an open mode of being spaced apart from the outlet 112 and a closed mode of being in close contact with the outlet 112.

In this case, the valve module 200 may discharge air through the outlet 112 due to a pressure of supplying air in the supply flow path 5 in the open mode, but the valve module 200 may also be closed in a reverse direction in which air flows in an opposite direction.

Figure 6:
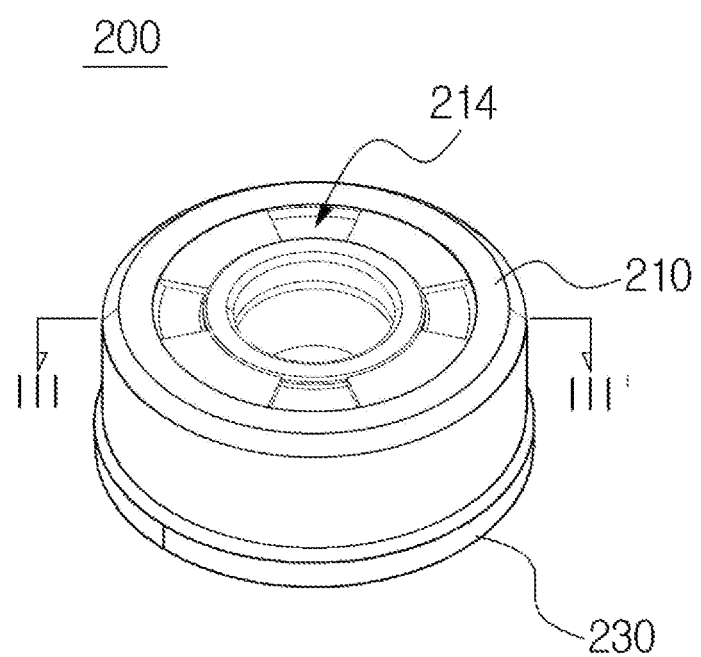
FIG. 6 is an enlarged perspective view of an air supply valve having a backflow prevention function shown in FIG. 5.
Figure 7A:
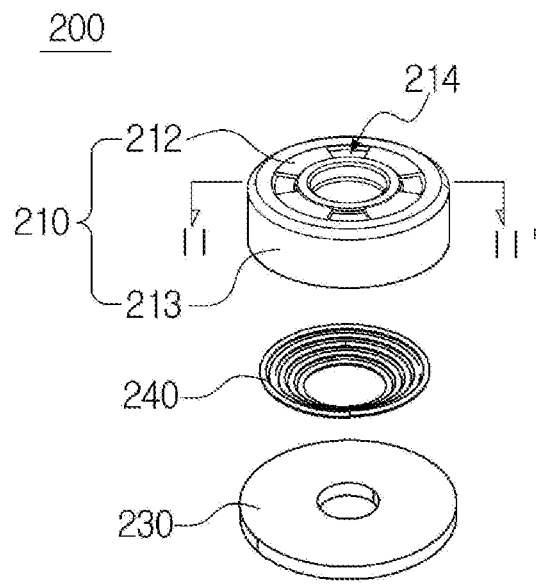
FIGS. 7A and 7B are exploded perspective views of an air supply valve having a backflow prevention function shown in FIG. 6.
Figure 7B:
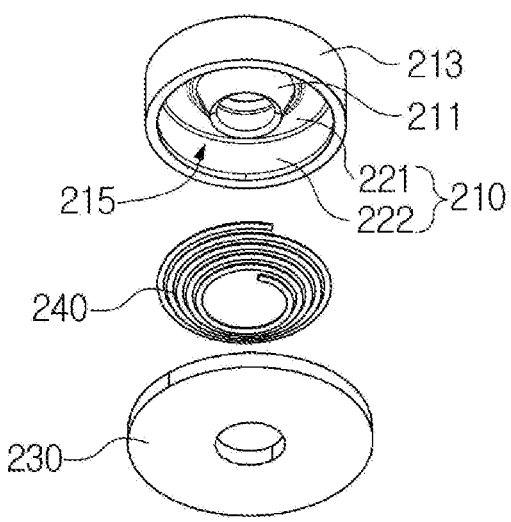

FIG. 6 is an enlarged perspective view of a valve module. FIGS. 7A and 7B are exploded perspective views of a valve module.

Referring to FIGS. 6 through 7B, the valve module 200 may include a shielding part, a support 230, and an elastic part 240. The shielding part may include a combination of an outer shielding part 210 and an inner shielding part 220 and may be a single component.

Based on the outlet 112 of FIG. 5, the outer shielding part 210 may be disposed closest to the outlet 112, the inner shielding part 220 may be disposed below the outer shielding part 210, and the support 230 may be disposed below the inner shielding part 220. The elastic part 240 may be interposed between the inner shielding part 220 and the support 230 to always provide elastic restoring force from the support 230 to the inner shielding part 220 and to provide pressing force in a direction toward the outlet.

An end of the stem 124 may pass through the inside of the outer shielding part 210, the inside of the inner shielding part 220, and the inside the elastic part 240, and the support 230 may be directly coupled to the end of the stem 124 to allow the valve module 200 to linearly reciprocate in a longitudinal direction of the valve module 200.

The outer shielding part 210 may include a stem sealing member 211, an outlet sealing member 212, and a cover member 213.

The outlet sealing member 212 may selectively come in contact with an area around the outlet 112 (hereinafter, refer to FIG. 5) to open and close the outlet 112. That is, in the open mode and the closed mode, the outlet sealing member 212 may be in close contact with a periphery of the outlet 112 to block the outlet 112, but the outlet sealing member may be spaced apart from the outlet 112 by a pressure at which air is supplied toward the outlet 112 from the supply flow path 5.

When a pressure of air is higher than restoring force of the elastic part 240, the outlet sealing member 212 may be spaced apart from an edge of the outlet 112 while the outer shielding part 210 descends.

In a central region of the outlet sealing member 212, the stem sealing member 211 through which the stem 124 passes may be integrally bent. The stem sealing member 211 may have a tapered tubular pipe structure and may support sliding movement of the outer shielding part 210 on the outer circumference of the stem 124. In addition, the stem sealing member 211 may be in close contact with the outer circumference of the stem 124 and may seal the outer circumference of the stem 124 while at least a portion of the stem sealing member 211 is inserted into a central region of the inner shielding part 220.

Here, the outer shielding part 210 and the inner shielding part 220 may be integrally formed through insert molding. The outer shielding part 210 may be disposed to surround an outer surface of the inner shielding part 220, and may be molded to allow an inner surface of the inner shielding part 220 to be exposed in an inner space 215.

The outer shielding part 210 and the inner shielding part 220 may be elastically supported against the support 230 by the elastic part 240. Then, the maximum distance at which the shielding part, which is a combination of the outer shielding part 210 and the inner shielding part 220, is to be spaced apart from the outlet may be larger than the maximum distance at which the support of the valve module moves.

A concave groove 214 formed in a process of forming the outer shielding part 210 and the inner shielding part 220 may be formed on an upper surface of the outlet sealing member 212. The concave groove 214 may advantageously reduce a weight of the outer shielding part 210 and may simultaneously reduce the cost through material reduction. According to the embodiment, a plurality of the concave grooves 214 may be provided at equal intervals from each other on an upper surface of the outlet sealing member 212 as an example.

The inner shielding part 220 may include an inner flange member 221 and a cylindrical member 222.

The inner flange member 221 may be disposed to face the outlet sealing member 212, and a guide hole into which the stem sealing member 211 is inserted may be formed in the center of the inner flange member 221. The stem sealing member 211 and the stem 124 inserted thereinto may pass together through the guide hole.

The cylindrical member 222 may be integrally bent downwardly from an end of the inner flange member 221, and the elastic part 240 may be accommodated in an inner space 225 of the inner shielding part 220.

The elastic part 240 may provide elastic restoring force between the inner shielding part 220 and the support 230 and may always pressurize the inner shielding part 220 in a direction toward the outlet 112 from the support 230.

The support 230 may be formed in a thin circular plate at the lowermost end of the valve module 200 and may move in a straight line in conjunction with the stem 124 while an end of the stem 124 is coupled to the center of the support 230.

Figure 8A:
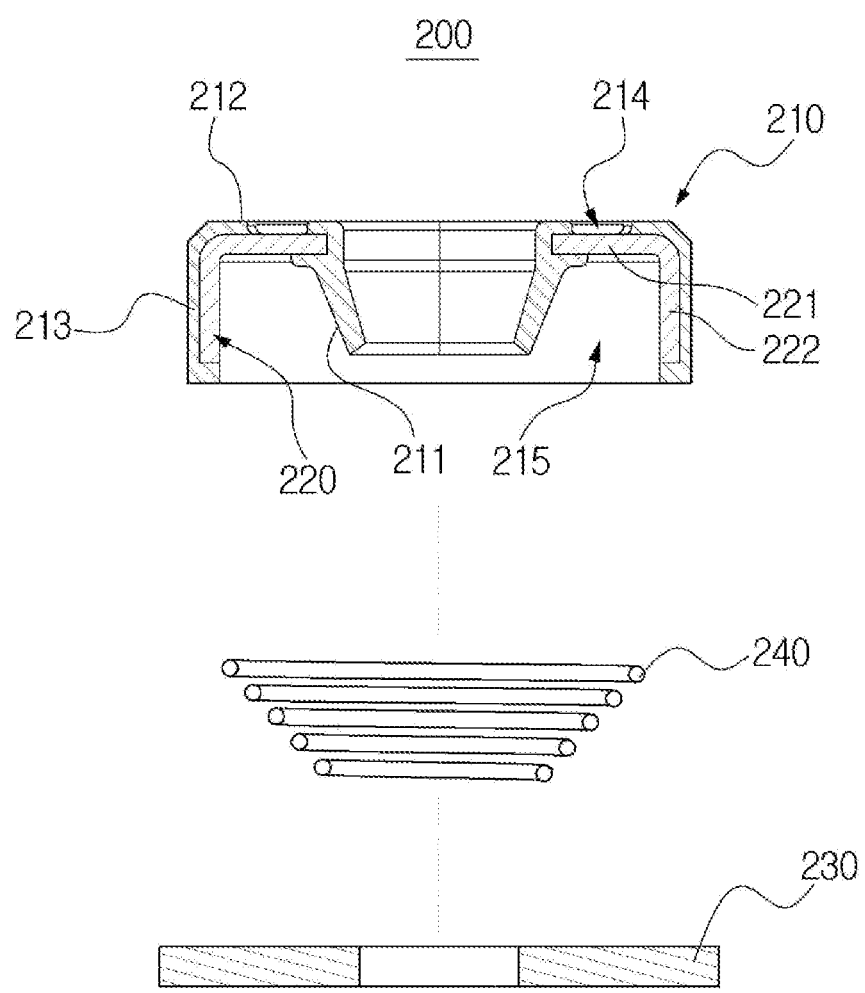
FIGS. 8A and 8B are cross-sectional views showing a section of an air supply valve having a backflow prevention function shown in FIGS. 7A and 7B taken along II-II'.
Figure 8B:
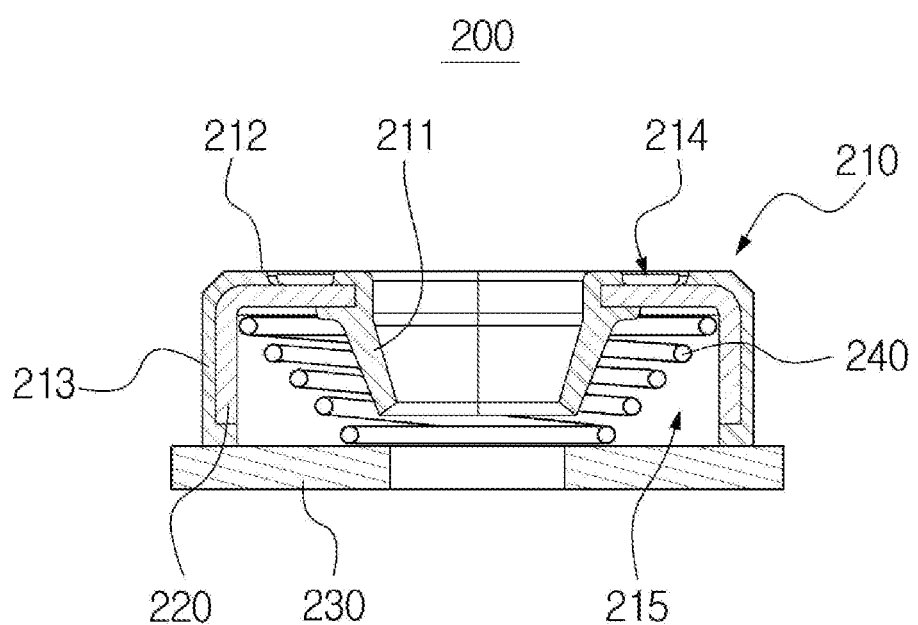

FIG. 8A is a cross-sectional view showing a section of the valve shown in FIG. 7A taken along II-II'. FIG. 8B is a cross-sectional view showing a section of the valve shown in FIG. 6 taken along III-III'.

The outer shielding part 210 may be integrally molded to cover outer surfaces of the inner flange member 221 and the cylindrical member 222 of the inner shielding part 220. That is, the outer shielding part 210 and the inner shielding part 220 may be integrally formed via an insert injection molding or powder sintering method in an area in which the outlet sealing member 212 overlaps the inner flange member 221 or an area in which the cover member 213 overlaps the cylindrical member 222.

For example, when the stem 124 and the support 230 descend in the open mode of the valve module 200, the outer shielding part 210 and the inner shielding part 220 may be pressured toward the outlet 112 by elastic restoring force of the elastic part 240, and in this case, the outer shielding part 210 and the support 230 may be moved apart from each other. When a pressure of air in the supply flow path 5 rises to push an upper surface of the outer shielding part 210 and when a condition in which the pressure of the air exceeds the elastic restoring force of the elastic part 240 is satisfied, the valve module 200 may be spaced apart from the outlet 112 and may be converted to an open mode.

Needless to say, when the pressure of the air in the supply flow path 5 decreases or the pressure increases in an opposite direction to a supply direction of the air in the supply flow path 5, that is, in a direction in which air or gas flows backward based on the outlet 112, even if the valve module 200 is not re-converted to the closed mode, the outer shielding part 210 and the inner shielding part 220 may be raised in contact with the outlet 112 by the elastic restoring force and backflow pressure of the elastic part 240.

The elastic part 240 may have a diameter that is gradually reduced toward the support 230 from the inner flange member 221 to correspond to a diameter of the stem 124 or the stem sealing member 211 that pass through the center while corresponding to a diameter of the inner flange member 221 inside the inner shielding part 220. Needless to say, although not shown in the drawing, the elastic part 240 may also have the same diameter in a height direction like a general coil spring shape.

FIGS. 9A through 9D are reference diagrams showing a state in which a valve module in a valve is operated.

Figure 9A:
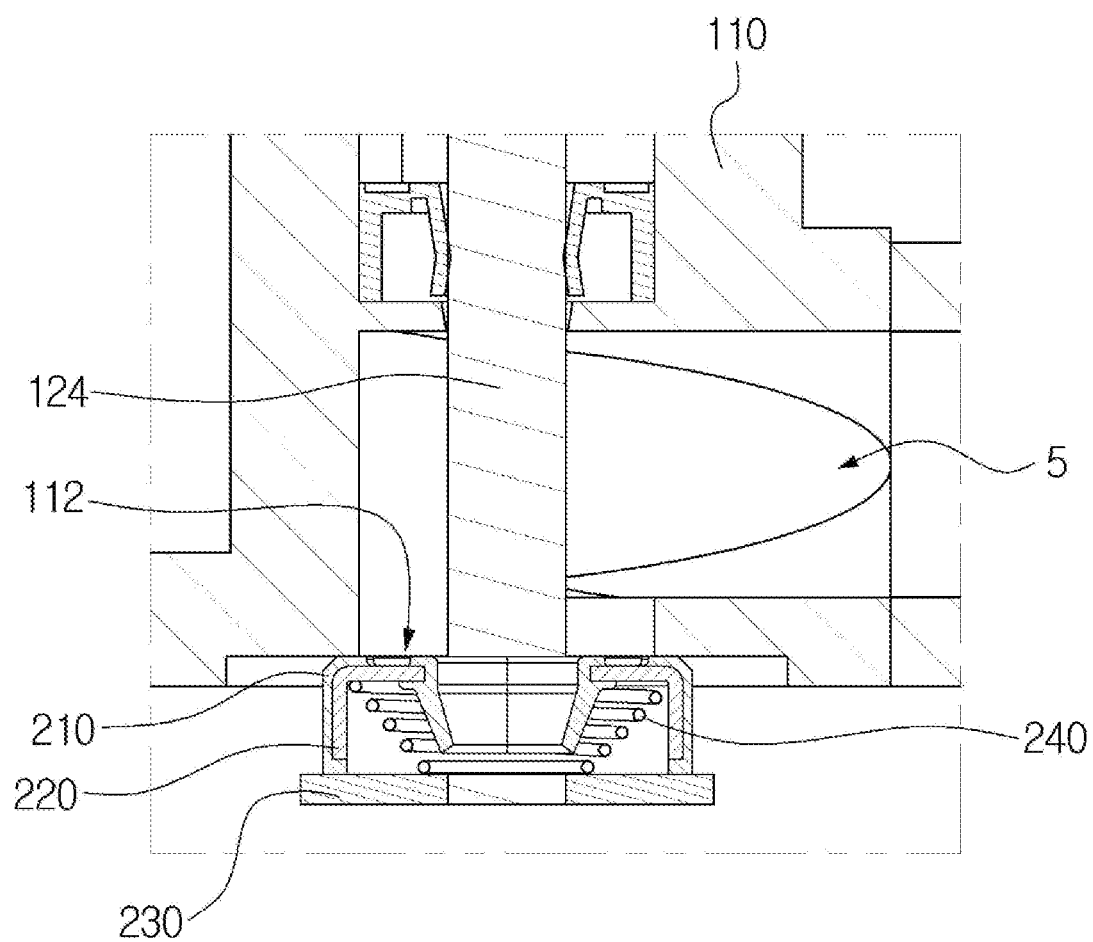
FIGS. 9A through 9D are reference diagrams showing a state in which a valve module of an air supply valve having a backflow prevention function shown in FIG. 5 is operated.

FIG. 9A shows the state in which the valve module 200 is operated in a closed mode.

That is, the valve module 200 may be raised to the maximum, and the outer shielding part 210 and the inner shielding part 220 may be disposed in contact with the outlet 112 while maintain the state in which the support 230 and the stem 124 are raised toward the outlet 112. Thus, movement of air or gas through the valve module 200 may be limited.

A gap (height) between the support 230 and an edge of the outlet 112 may be substantially the same as a height of the outer shielding part 210, and the elastic part 240 may be compressed to the maximum.

In this state, the outer shielding part 210 and the inner shielding part 220 may be fixed without moving between the outlet 112 and the support 230. Accordingly, even if air is supplied from the supply flow path 5 to the outlet 112, the outer shielding part 210 and the inner shielding part 220 may not move, and thus the outlet 112 may not be opened.

Figure 9B:
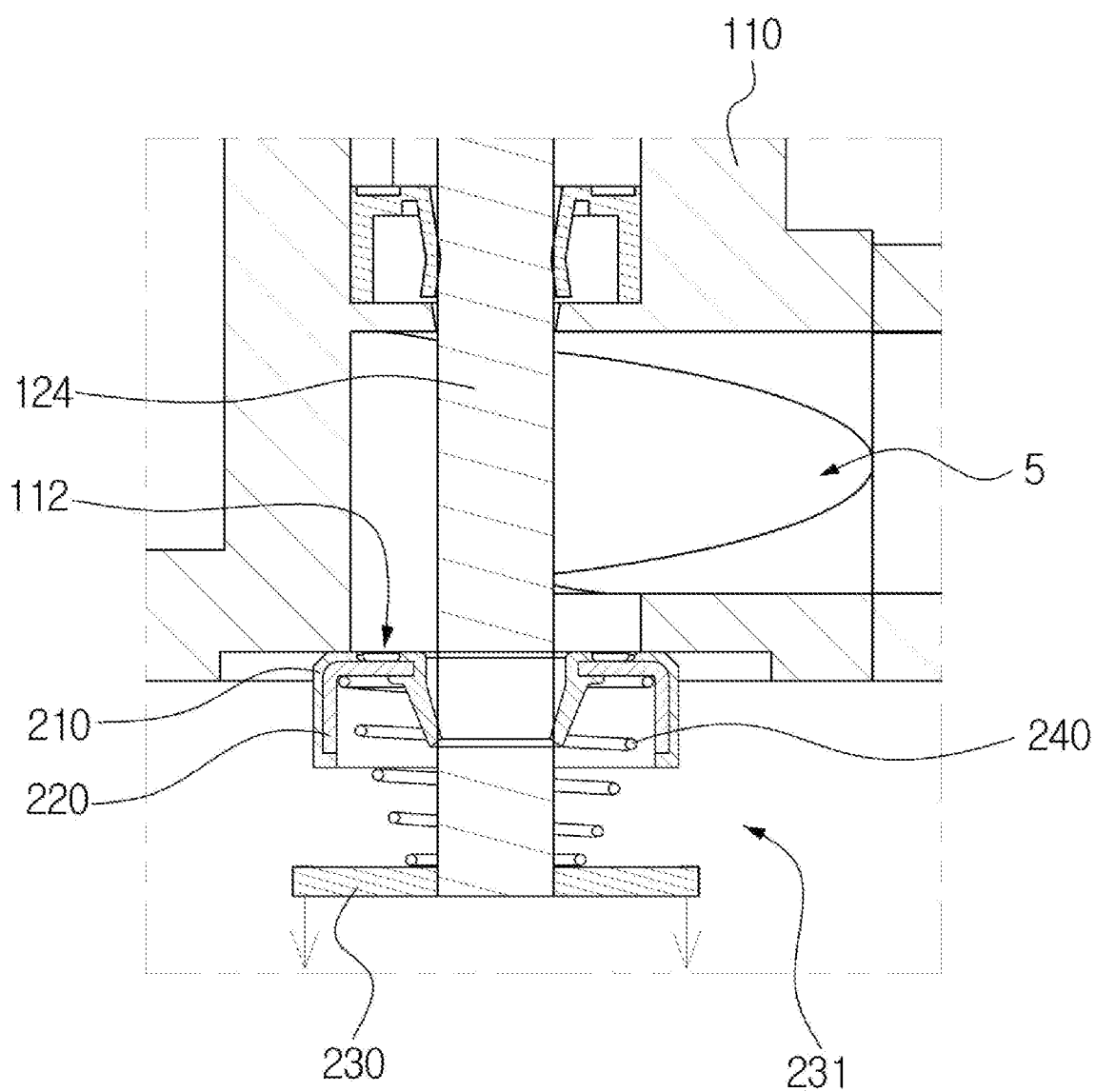

FIG. 9B shows the state in which the outer shielding part 210 and the inner shielding part 220 are operated in a temporarily closed mode. FIG. 9B shows the state in which the support 230 and the stem 124 are lowered while the outer shielding part 210 and the inner shielding part 220 are in a temporarily closed mode.

The gap (height) between the support 230 and the edge of the outlet 112 may be larger (longer) than the height of the outer shielding part 210.

In this state, when the elastic part 240 extends to the maximum and an upper end thereof rises because there is no or little pressure in a direction in which air is supplied, or when a pressure in a backflow direction opposite to a supply direction of the air is larger than a pressure in the supply direction of the air, the outer shielding part 210 and the inner shielding part 220 may be disposed in close contact with the outlet 112.

Figure 9C:
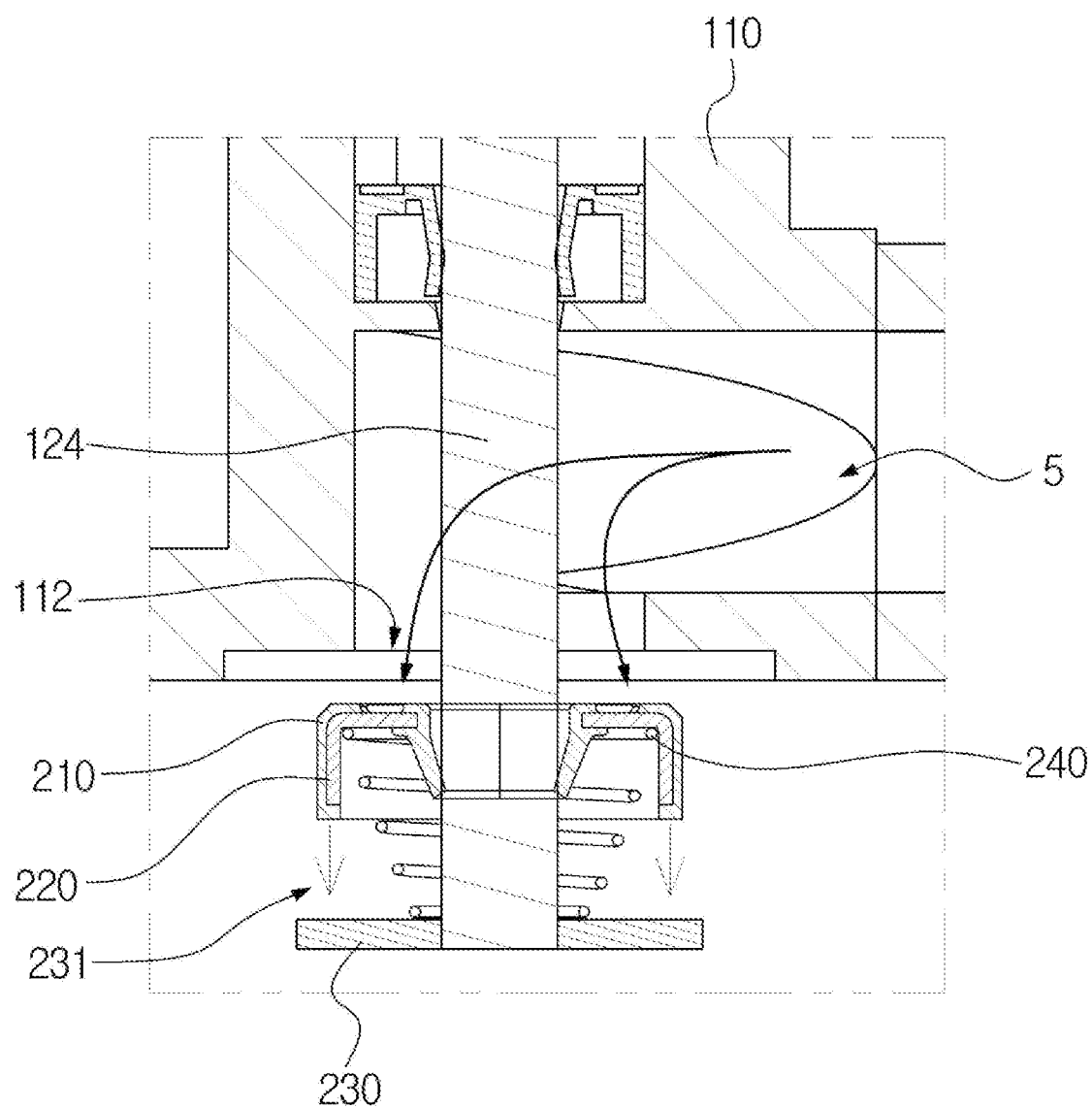

FIG. 9C shows the state in which the outer shielding part 210 and the inner shielding part 220 are converted to an open mode in which air is supplied through the outlet 112 from the supply flow path from the temporarily closed mode of FIG. 9B.

In this case, as an inflow pressure of the air supplied from the supply flow path toward the outlet 112 becomes greater than elastic restoring force of the elastic part 240, the outer shielding part 210 and the inner shielding part 220 may be lowered.

Thus, the outer shielding part 210 and the inner shielding part 220 may be spaced apart from the outlet 112, and while the supply pressure of the air toward the outlet 112 from the supply flow path 5 is maintained, the outer shielding part 210 and the inner shielding part 220 may be maintained to be spaced apart from each other.

In the open mode of the valve module 200, even if the outer shielding part 210 and the inner shielding part 220 are spaced apart from the outlet 112 to the maximum, the inner shielding part 220 and the support 230 may be spaced apart from each other without contacting each other by the elastic part 240. In an open mode, a separation space 231 between the inner shielding part 220 and the support 230 may be a space into which at least a portion of backflow pressure is introduced.

Although not shown in the drawing, the support 230 may be provided with a plurality of through-holes (not shown) connected to the inside of the inner shielding part 220 in an area other than a central area coupled to the stem 124. As such, when a through hole is formed in the support 230, the backflow pressure may be easily transmitted to the inner shielding part 220 or the outer shielding part 210 through the through hole of the support 230 together with the separation space 231 between the inner shielding part 220 and the support 230.

Figure 9D:
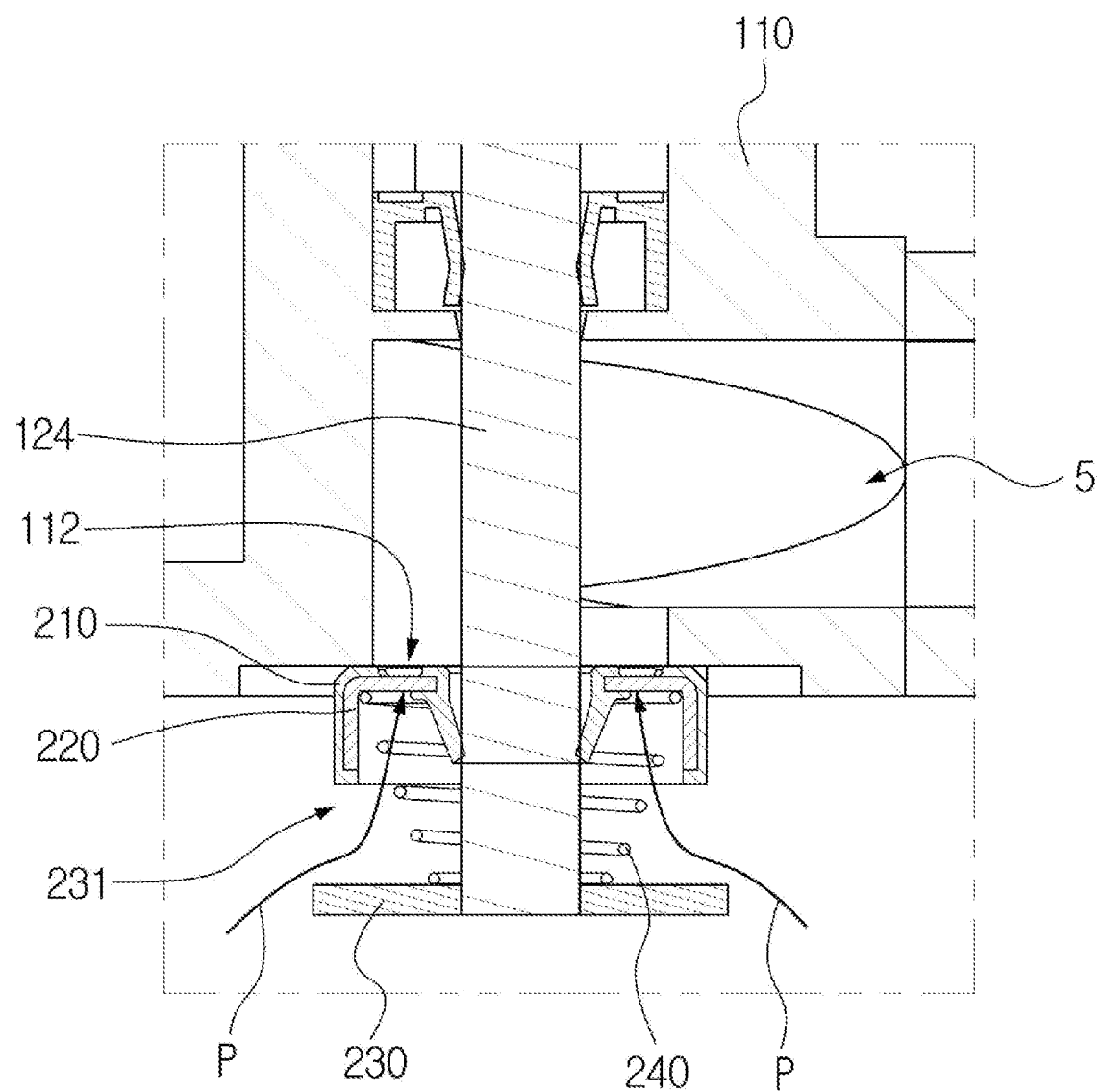

FIG. 9D shows the state in which the valve module 200 is converted to a backflow prevention mode from an open mode. In the backflow prevention mode, the outer shielding part 210 and the inner shielding part 220 may be disposed in close contact with the outlet 112 to limit supply of the air in the supply flow path 5. In the backflow prevention mode, while a pressure in a backflow direction from the outlet 112 rapidly increases, a backflow pressure P introduced to the inside through the separation space 231 between the inner shielding part 220 and the support 230 may pressurize the outer shielding part 210 and the inner shielding part 220 in a direction toward the outlet 112, and the elastic restoring force of the elastic part 240 may pressurize the inner shielding part 220 with the outer shielding part 210 in a direction toward the outlet 112, and accordingly, the outer shielding part 210 and the inner shielding part 220 may instantly come in contact with the outlet 112.

Accordingly, even if the pressure rises rapidly in a backflow direction, in response thereto, the outer shielding part and the inner shielding part of the valve module may rapidly shield the outlet 112, and thus an effect of preventing backflow may be expected.

FIGS. 10A through 11B show various embodiments of a shape of an upper edge of an outer shielding part of a valve module.

Figure 10A:
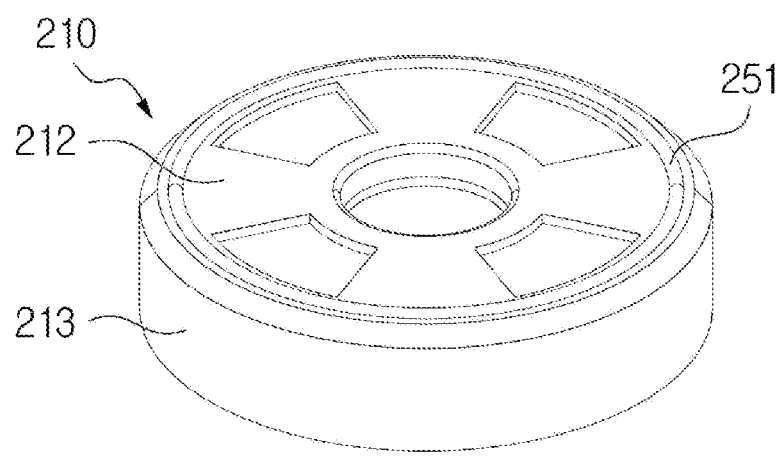
FIGS. 10A through 11B are reference diagrams showing various embodiments of a shape of an outer shielding part of a valve module of an air supply valve having a backflow prevention function according to an embodiment of the present disclosure.
Figure 10B:

Referring to FIGS. 10A and 10B, the outer shielding part 210 may include the outlet sealing member 212 and the cover member 213, and a top sealing member 251 may be provided on an upper surface of the outlet sealing member 212.

The top sealing member 251 may be integrally molded simultaneously or through an additional process during a process in which the outer shielding part 210 and the inner shielding part 220 (refer to FIGS. 7A and 7B) are molded. The top sealing member 251 may be formed of a different material from the outlet sealing member 212, and for example, the top sealing member 251 may be formed of a silicone or synthetic rubber material.

The top sealing member 251 may increase sealing performance in a process in which the outer shielding part 210 comes in close contact with the outlet 112 (refer to FIG. 9A).

In a process in which the valve module 200 (refer to FIG. 5) moves up and down with the stem 124, the top sealing member 251 may be deformed and restored to a predetermined degree to completely seal the outer shielding part 210 and the outlet 112 even if the top sealing member 251 does not contact in parallel to a periphery of the outlet 112. For example, when the valve module 200 rises obliquely toward the outlet 112, a region at one side of the top sealing member 251, which rises to a height closer to the outlet 112, may be pressed relatively more and an outer appearance may be largely deformed, and in contrast, an outer appearance of the top sealing member 251 may be deformed to prevent decrease in the sealing performance of the outer shielding part 210 from the outlet 112 while a region at the other side of the top sealing member 251 is pressed relatively less and the outer appearance is less deformed.

In FIGS. 10A and 10B, one section of the top sealing member 251 has an approximately semi-circular shape, but the shape thereof is not limited thereto and may be formed in an oval or polygonal shape.

Figure 11A:
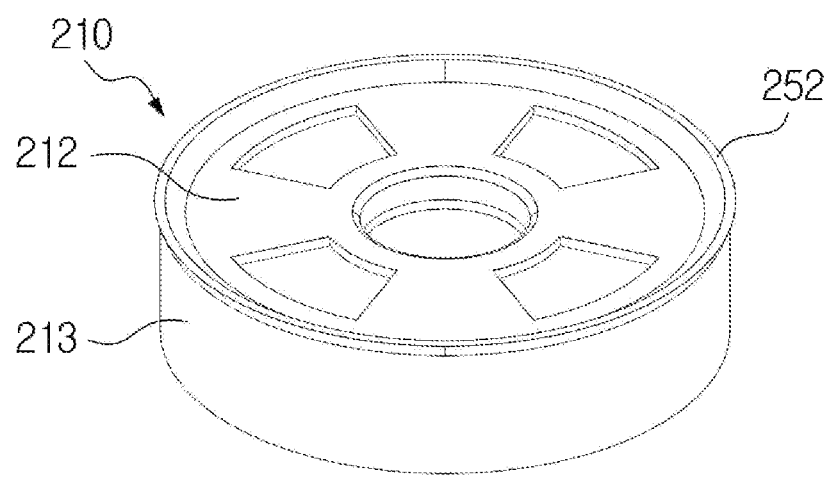
Figure 11B:
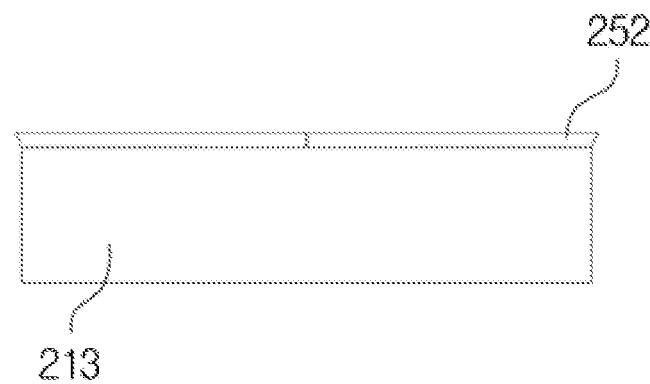

Referring to FIGS. 11A and 11B, the outer shielding part 210 may include the outlet sealing member 212 and the cover member 213, and a top sealing member 252 may be provided on an upper surface of the outlet sealing member 212.

The top sealing member 252 may be disposed in a corner area adjacent to the outlet sealing member 212 and the cover member 213. For example, the top sealing member 252 may extend obliquely while protruding more than the outer circumference of the cover member 213. Needless to say, the top sealing member 252 may extend in a diagonal direction that goes inward from the outer circumference of the cover member 213.

The top sealing member 252 may provide an effect of being in close contact with a periphery of the outlet 112, and simultaneously, in the open mode in which the valve module 200 is spaced apart from the outlet 112, a pressure of air supplied toward the outlet 112 from the supply flow path 5 (refer to FIG. 9A) may be easily transmitted.

The top sealing member 252 of FIGS. 11A and 11B may also have a structure and a material for deforming an outer appearance thereof, and a function and effect of the top sealing member 252 may be the same as the embodiment of FIGS. 10A and 10B, and accordingly, a repeated description thereof is omitted.

The air supply valve having a backflow prevention function according to the present disclosure may have the following effects.

First, an open and closed state may be firmly maintained even with a large pressure by driving the valve module that moves in a straight line.

Second, a stem that moves in a straight line may include a stopper, thereby preventing the stem from being separated from the mold.

Third, a stair may be provided in a mounting groove inside a housing, and a sealing member may be provided in the stair, thereby preventing moisture from being introduced toward a driver.

Fourth, rotation between the second bush and the stem may be prevented.

The effects of the disclosure are not limited to the above-described effects and other effects which are not described herein may be derived by those skilled in the art from the following claims.

In the above, specific embodiments have been shown and described to illustrate the technical idea of the present disclosure, but the present disclosure is not limited to the same configuration and operation as the specific embodiments as described above, and various modifications may be made without departing from the scope of the present disclosure. Accordingly, such modifications need to be considered to fall within the scope of the present disclosure, and the scope of the present disclosure needs to be determined by the following claims.

What is claimed is:

1. An air supply valve having a backflow prevention function, comprising:
    a housing that includes a motor mounted therein and in which a supply flow path and an outlet of air are formed;
    a driver including a gear part for transmitting driving force of the motor and a converter for converting rotation of the gear part to linear motion; and
    a valve module that is coupled to an end of the converter and is opened while being spaced apart from the outlet of the housing to be connected to the supply flow path or is closed while being in contact with the outlet,
    wherein the driver includes a stem that is connected to the valve module and moves in a straight line,
    wherein a support of the valve module is coupled and fixed to the stem, and
    wherein a shielding part of the valve module is provided to relatively move with respect to the support and the stem, is provided to be moved by a pressure of air applied to the valve module, closes the outlet by receiving a pressure of backflow air when backflow applied to the valve module is generated, is lowered according to a larger air pressure than elastic force of an elastic part, applied from an upper part of the shielding part, and is raised according to a pressure of backflow air applied from a lower part of the shielding part.

2. The air supply valve having of claim 1, wherein the elastic part is provided between the support and the shielding part.

3. The air supply valve having of claim 2, wherein, when the stem and the valve module are lowed and a gap between the outlet and the support is larger than a thickness of the shielding part, the shielding part is supported by elastic force of the elastic part, and is raised from the support and comes in contact with an edge of the outlet to close the outlet.

4. The air supply valve having of claim 3, wherein, when a pressure of air moving in a direction toward the outlet from the supply flow path is larger than elastic restoring force of the elastic part, the shielding part is lowered from the outlet to open the outlet.

5. The air supply valve having of claim 4, wherein, when the shielding part is lowered from the outlet and air backflows in a direction toward the shielding part in a state in which air is discharged from the outlet, the shielding part is raised to close the outlet.

6. The air supply valve having of claim 1, wherein the shielding part includes an outer shielding part that selectively comes in contact with an edge of the outlet and performs a sealing function,
    wherein the stem passes through a center of the outer shielding part, and
    wherein a stem sealing member that is in contact with an outer circumference of the stem and performs the sealing function is provided on the outer shielding part.

7. The air supply valve having of claim 6, wherein the shielding part further includes an inner shielding part disposed inside the outer shielding part, and
    wherein the inner shielding part includes an inner flange member including a guide hole formed therein, into which another end of the stem sealing member is inserted, and a cylindrical member bent from an corner of the inner flange member.

8. The air supply valve having of claim 6, wherein the outer shielding part includes a top sealing member that is disposed on an upper surface or a corner region in contact with an edge of the outlet and has a deformable outer appearance.

9. The air supply valve having of claim 8, wherein, when the outer shielding part is in parallel contact with the edge of the outlet, the top sealing member seals the outlet while an outer appearance of the top sealing member is uniformly deformed, and wherein, when the outer shielding part is in non-parallel contact with the edge of the outlet, the top sealing member seals the outlet while the outer appearance of the top sealing member is unevenly deformed.

10. The air supply valve having of claim 1, wherein the gear part includes:

a main gear coupled to a rotation shaft of the motor; and a driven gear that is engaged with the main gear and rotates, and wherein the driven gear includes a hollow shaft provided on a rotation center thereof.

11. The air supply valve having of claim 10, wherein the converter includes:

a mold including a female screw formed on an inner circumference thereof and disposed inside the hollow shaft;

a bearing interposed between an outer circumference of the shaft and an operation hole;

a first bush configured to rotatably support the shaft inside the operation hole; and a second bush configured to support linear motion of the stem inside the operation hole, and wherein the stem is disposed in a longitudinal direction of an operation hole provided in the housing, includes a male screw formed on an outer circumference of one end, and is engaged with a female screw of the mold to move in a straight line.

12. The air supply valve having of claim 11, wherein the housing includes a stair protruding toward the stem from an inner circumference of the operation hole adjacent to the supply flow path, and wherein the converter includes a sealing member configured to seal a portion between the stem and the operation hole between the stair and the second bush.

13. The air supply valve having of claim 11, wherein the converter includes a stopper coupled to an outer circumference of the stem and configured to limit a range of linear motion of the stem, and wherein the stopper is moveably disposed within a range between the mold or the shaft and the second bush.

14. The air supply valve having of claim 11, wherein the stem includes a coupler in which an outer circumference of at least a portion of a central region is flat, and wherein an inner circumference of the second bush has a shape corresponding to a shape of the coupler and the second bush guides linear motion of the stem.

15. A valve module for selectively opening and closing the outlet according to linear motion of a stem of a valve in an outlet of a valve housing, comprising:

a support provided at an end of the stem;

a shielding part provided to relatively move with respect to the support and the stem, provided to be moved by a pressure of air applied to the valve module, and closing the outlet by receiving a pressure of backflow air when backflow applied to the valve module is generated; and an elastic part provided between the shielding part and the support, wherein the shielding part is lowered according to a larger air pressure than elastic force of the elastic part, applied from an upper part of the shielding part, and is raised according to a pressure of backflow air applied from a lower part of the shielding part, wherein the shielding part includes an outer shielding part that selectively comes in contact with an edge of the outlet and performs a sealing function, wherein the stem passes through a center of the outer shielding part, wherein a stem sealing member that is in contact with an outer circumference of the stem and performs the sealing function is provided on the outer shielding part, wherein the shielding part further includes an inner shielding part disposed inside the outer shielding part, wherein the inner shielding part includes an inner flange member including a guide hole formed therein, into which another end of the stem sealing member is inserted, and a cylindrical member bent from an corner of the inner flange member.

16. The valve module of claim 15, wherein, when the stem and the valve module are lowed and a gap between the outlet and the support is larger than a thickness of the shielding part, the shielding part is supported by elastic force of the elastic part, and is raised from the support and comes in contact with an edge of the outlet to close the outlet.

17. The valve module of claim 16, wherein, when a pressure of air moving in a direction toward the outlet from a supply flow path is larger than elastic restoring force of the elastic part, the shielding part is lowered from the outlet to open the outlet.

18. The valve module of claim 17, wherein, when the shielding part is lowered from the outlet and air backflows in a direction toward the shielding part in a state in which air is discharged from the outlet, the shielding part is raised to close the outlet.

* * * * *